(12) United States Patent
Nitzpon

(10) Patent No.: US 8,308,436 B2
(45) Date of Patent: Nov. 13, 2012

(54) APPARATUS FOR POSITIONING A GEARBOX IN A WIND ENERGY PLANT

(75) Inventor: Joachim Nitzpon, Steffenshagen (DE)

(73) Assignee: Nordex Energy GmbH, Norderstedt (DE)

( * ) Notice: Subject to any disclaimer, the term of this patent is extended or adjusted under 35 U.S.C. 154(b) by 639 days.

(21) Appl. No.: 12/411,872

(22) Filed: Mar. 26, 2009

(65) Prior Publication Data

US 2010/0215497 A1    Aug. 26, 2010

(30) Foreign Application Priority Data

Feb. 20, 2009    (DE) .................... 10 2009 010 584

(51) Int. Cl.
*A47C 7/74* (2006.01)
(52) U.S. Cl. .................... 416/170 R; 74/380; 74/410
(58) Field of Classification Search ............. 416/170 R; 74/380, 410
See application file for complete search history.

(56) References Cited

U.S. PATENT DOCUMENTS

| | | | | |
|---|---|---|---|---|
| 4,265,136 A | * | 5/1981 | Riegler et al. | 74/380 |
| 5,360,195 A | | 11/1994 | Young | |
| 5,690,304 A | | 11/1997 | Folkens | |

FOREIGN PATENT DOCUMENTS

| | | |
|---|---|---|
| DE | 20 2005 001 519 U1 | 12/2005 |
| EP | 1 566 543 A1 | 12/2005 |
| EP | 2 003 362 | 12/2008 |
| WO | 2010/037846 A2 | 4/2010 |

* cited by examiner

*Primary Examiner* — Long Pham
(74) *Attorney, Agent, or Firm* — Vidas, Arrett & Steinkraus, P.A.

(57) ABSTRACT

An apparatus for positioning a gearbox in a wind energy plant, which gearbox is supported on a bearing structure of the wind energy plant by way of a torque support, wherein the torque support is mounted via at least one uncoupling element, which is arranged between torque support and bearing structure, wherein the torque support features at least one support body and an hydraulic apparatus with at least one hydraulic cylinder, by way of which the position of the support body is adjustable with respect to the bearing structure.

26 Claims, 2 Drawing Sheets

APPARATUS FOR POSITIONING A GEARBOX IN A WIND ENERGY PLANT

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to an apparatus for positioning a gearbox in a wind energy plant, which gearbox is mounted by way of a planet carrier shaft in prolongation of the rotor shaft, and is supported on a bearing structure of the wind energy plant by way of a torque support.

In wind energy plants, it is frequently resorted to a two-point bearing or a moment bearing in order to mount the rotor. In this bearing, the gearbox is tied at the generator side to a rotor shaft or a construction similar to the rotor shaft directly or via a flange, in order to transfer the torques from the rotor into the gearbox for torque conversion. However, at the generator side of the rotor bearing, the gearbox is mounted like the rotor by way of the gearbox input shaft (the planet carrier shaft) connected to the rotor shaft and in connection with a planet carrier of the first planetary stage of the gearbox. The reaction moments on the gearbox occurring in the torque of the wind energy plant must be guided into a bearing structure via a torque support. In order to avoid a statically overdetermined bearing of the gearbox through the combination of rotor bearing and planet carrier bearing, it is known to use uncoupling elements on the torque support. By way of example, such uncoupling elements are known from EP 1 566 543 A1, the entire contents of which is incorporated herein by reference, and from DE 20 2005 001 519 U1, the entire contents of which is incorporated herein by reference. It is the task of the uncoupling elements to reduce the additional bearing forces which occur in rotor bearings and in the planet carrier bearings due to production tolerances, deviations in the installation and deformations in the operation. The uncoupling elements are made of elastomers, which have a predetermined stiffness or a matched characteristic curve of the stiffness.

When using uncoupling elements, it is necessary to adjust the position of the gearbox with respect to the rotor bearing very accurately on location, in order to keep the influence of production deviations and installation deviations as small as possible. Up to now, the positioning of the gearbox takes place by two wedges for instance, which are shifted against each other in order to accurately adjust the height of the torque support with respect to the bearing structure in this way.

The present invention is based on the objective to provide an apparatus for positioning a gearbox in a wind energy plant which permits an accurate positioning of the gearbox with means which are as simple as possible.

BRIEF SUMMARY OF THE INVENTION

The apparatus of the present invention serves for positioning a gearbox in a wind energy plant. The gearbox is supported on a bearing structure of the wind energy plant by way of a torque support, wherein the torque support is mounted via at least one uncoupling element, which is arranged between torque support and bearing structure. According to the present invention, the torque support features at least one support body and a hydraulic apparatus with at least one hydraulic cylinder. By means of the hydraulic cylinder of the hydraulic apparatus, the position of the support body is adjustable with respect to the bearing structure, whereby even the position of the support body with respect to the bearing structure is adjustable. The use of a hydraulic apparatus permits to adjust the position of the uncoupling element with respect to the support body, so that production and installation tolerances can be compensated in a simple way and the torque support adjusts the gearbox into the desired position with respect to the bearing structure.

In a preferred embodiment, the hydraulic cylinder is integrated into the support body. Preferably, the torque support is constructed in the form of a ring-shaped housing part of the gearbox, which has two projecting support bodies at the sides, which are connected to a bearing structure of the wind energy plant via uncoupling elements.

In a further advantageous embodiment, the support body has two hydraulic cylinders, oriented in opposite directions. By the actuation of the hydraulic cylinder, a force acting on the support body in opposite directions can be exerted on the support body in the positioning, so that the support body is permitted to be positioned and if necessary, biasing forces can be applied to the uncoupling elements.

Advantageously, the hydraulic cylinder features a ram and a face plate, wherein the ram is guided in the support body and the face plate is arranged outside of the support body. The entity of ram and face plate protruding from the support body serves as a support for the uncoupling element, which is arranged on a front side of the face plate.

In a preferred embodiment of the present invention, a locking device is provided for the face plate, which locks the face plate in its position relative to the support body. The locking device is used when the support body has been positioned by using the hydraulic cylinder, has taken its final position and after the uncoupling element is biased if need be. In order not to have to pressurise the hydraulic cylinder permanently, the locking device is used, which keeps the face plate at the head side on the ram in the defined position, or supports it against the support body in a defined distance. In connection with an uncoupling element whose stiffness is adjustable, the apparatus according to the present invention is particularly advantageous, because the hydraulic cylinder does not have to supply the high biasing forces that occur in the adjustment of the uncoupling element. The adjustment of the stiffness of the uncoupling element takes place only after the entity of ram and face plate of the hydraulic cylinder has been locked by the locking device.

Preferably, the locking device features an adjusting nut, the external thread of which co-operates with an external thread of the face plate. The adjusting nut can be screwed over the face plate, until it bears against the support body and supports the face plate with respect to the same. Through this, it is avoided that the face plate and the ram are pushed back into the hydraulic cylinder. Alternatively, the adjusting nut may also be arranged between the support body and the face plate, and co-operate with a thread portion on the end of the face plate pointing towards the support body. In addition, the locking device can be formed in two parts, with an inner ring and an outer ring, which are adjustable in their height by being screwed into each other.

In a preferred embodiment, the support body has one hydraulic connection for each hydraulic cylinder at a time, in order to actuate the hydraulic cylinder. In this way, it is made sure that the hydraulic cylinders can be adjusted independently from each other and can also be pressurised with different pressures. Through this, it is possible to choose a bias and to exert a predetermined moment to the rotor shaft, in co-operation with the rotor bearing. The bearing forces of the rotor bearing and of the planet carrier bearing can be changed by different pressures in the hydraulic cylinders.

In a preferred embodiment, the torque support has two support bodies located opposite to each other, wherein preferably each support body is connected to the bearing structure by way of two uncoupling elements located opposite to each other.

BRIEF DESCRIPTION OF THE SEVERAL VIEWS OF THE DRAWINGS

A preferred example of realisation is explained in more detail by means of the figures in the following.

DETAILED DESCRIPTION OF THE INVENTION

Figure 1:
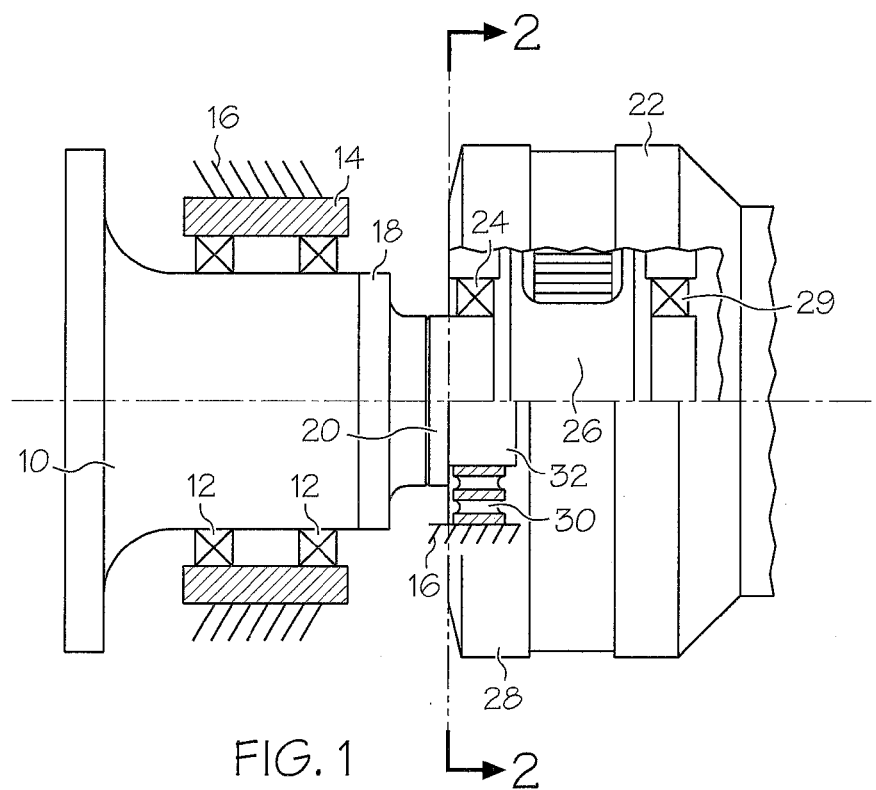
FIG. 1 shows a partly cut-out view on the gearbox bearing, seen from the side.

While this invention may be embodied in many different forms, there are described in detail herein a specific preferred embodiment of the invention. This description is an exemplification of the principles of the invention and is not intended to limit the invention to the particular embodiment illustrated FIG. 1 shows a rotor shaft 10 in a principle sketch, which is mounted on a bearing structure 16 via a schematically depicted rotor bearing 12 within a rotor bearing housing 14. At the gearbox side, the rotor shaft 10 has a flange 18, which is connected to a planet carrier shaft 20 of the gearbox 22. By way of also schematically depicted planet carrier bearings 24 and 29, the gearbox is mounted on the planet carrier shaft 20. Planet carrier shaft 20 and planet carrier 26 form an entity here. The planet carrier shaft 20 transfers a torque of the rotor shaft 10 to the planet carrier 26 of the gearbox.

Figure 2:
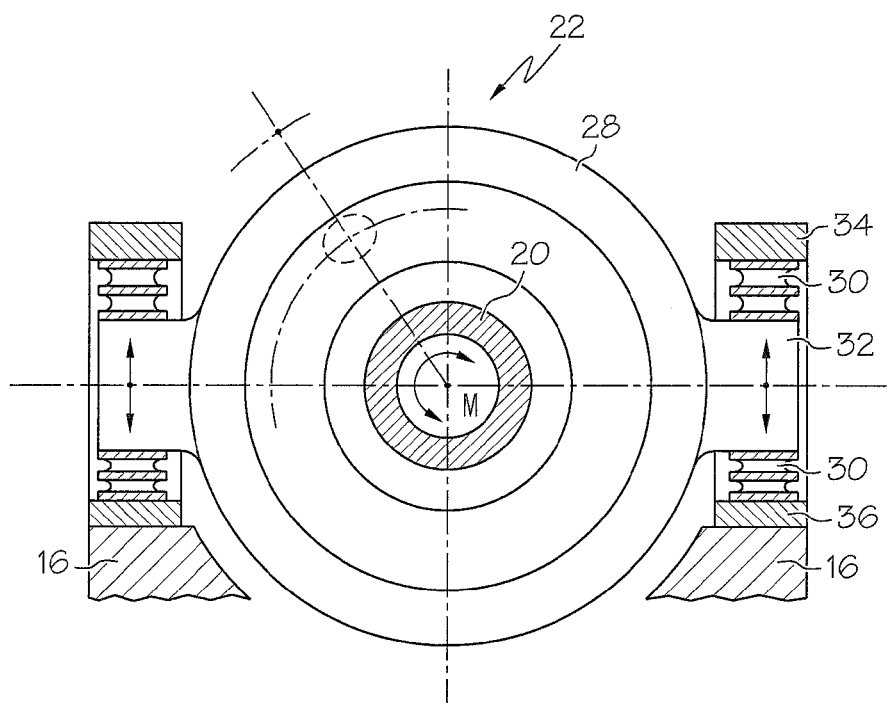
FIG. 2 shows a side view from the rotor direction to the cut-out along the line A-A of FIG. 1.

In order to dissipate the reaction moments acting on the gearbox 22, a torque support 28 is provided. As depicted in FIG. 2, the torque support 28 features two support bodies 32. In FIG. 1, the torque support 28 is represented as a cut-out, only the lower half being visible. With its support body 32, the torque support 28 is supported on the bearing structure 16 by way of an uncoupling element 30, wherein upper and lower yoke as well as the stay (compare FIG. 2 and FIG. 5) are not depicted for the sake of better overview.

From the depiction in FIG. 1, it becomes directly clear that the position of the rotor shaft and with this also that of the planet carrier shaft is fixed by the rotor beatings 12. In order to tie the torque support, it is therefore necessary to provide uncoupling elements, otherwise an overdetermined bearing could take place.

FIG. 2 shows a side view seen from the rotor to the cut-out along the line A-A of FIG. 1. FIG. 2 shows the bearing structure 16 in that region in which the bearing structure 16 mounts the torque support 28. From the torque support 28, the support body 32 can be recognised in FIG. 2, which is mounted between two uncoupling elements 30 at a time. Depending on the execution of the torque support, the support body can be formed in one piece with the gearbox housing. In this case, the support body 32 forms already the torque support. In another embodiment, the torque support can be executed as a ring-shaped housing part of the gearbox, wherein the support bodies project laterally. In FIG. 2, it can be recognised also that the uncoupling elements are not mounted immediately on the bearing structure, but via an upper yoke 34 and a lower yoke 36, respectively. Upper and lower yoke are connected with each other by stays 56 (only one stay at the generator side being depicted here). In the hydraulic positioning of the support body, the entity from lower yoke, support and upper yoke has not to be separated.

The planet carrier shaft 20 is also shown in FIG. 2, and a side view in cut-out A-A from the rotor direction to the gearbox 22 can be recognised. The reaction moment occurring from the driving moments M, which are represented by double arrows, is converted by the support bodies 32 into a reaction force which is also represented by double arrows. The reaction force F is dissipated to the bearing structure 16 by the uncoupling elements 30 and the upper and the lower yoke. When there are several support bodies, the reaction force resulting from the reaction moment is divided among the uncoupling elements according to the number of the support bodies.

FIG. 2 makes clear which problems can arise in the positioning of the gearbox. The position of the gearbox is fixed by way of the bearing of the rotor shaft. On the other hand, however, the position of the bearing structure is also fixedly preset, so that for instance a tie of the torque support to the bearing structure has to be performed by the use of suitable yokes. Such a positioning is very sumptuous.

Figure 3:
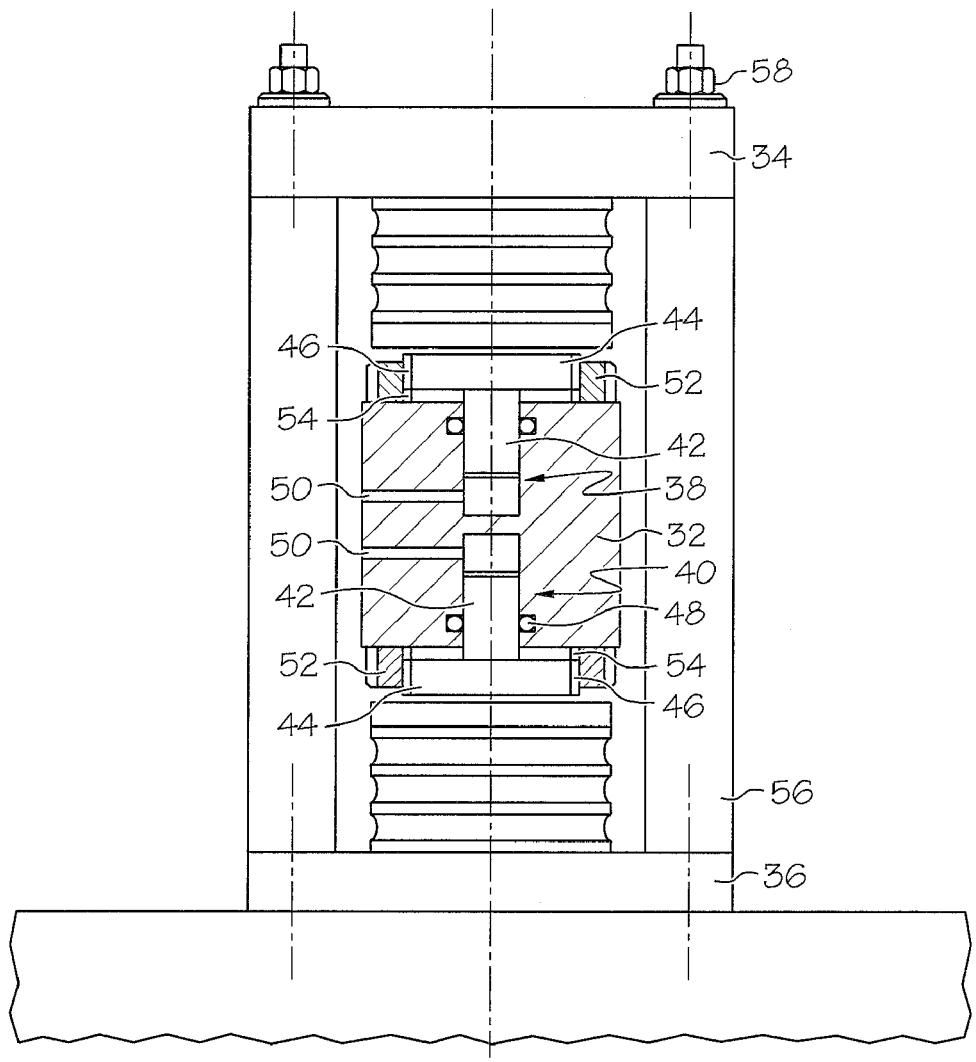
FIG. 3 shows a section through the support body.

FIG. 3 shows a section through a support body 32, in which the hydraulic cylinders 38 and 40 can be recognised. The hydraulic cylinders each feature a cylindrical blind hole bore in the support body 32. In the blind hole bore is arranged a ram 42, which has a face plate 44. The face plate 44 is formed like a disc and has an external thread 46 on its outer side. The ram 42 is sealed in the blind hole bore by way of a sealing system 48. The blind hole bore, in which the ram 42 is guided, has a hydraulic connection 50. The hydraulic connection has a channel, which runs out near to the bottom of the blind hole bore into the same. By way of the hydraulic connection 50, the hydraulic medium can be supplied to the blind hole bore, and through this the position of the ram 42 and the face plate 44 with respect to the support body 32 can be adjusted.

In addition, a locking device with an adjusting nut 52 is provided in FIG. 3, which has an internal thread 54. The adjusting nut 52 is screwed together with the face plate 44 or with a lower face plate portion, respectively.

Figure 4:
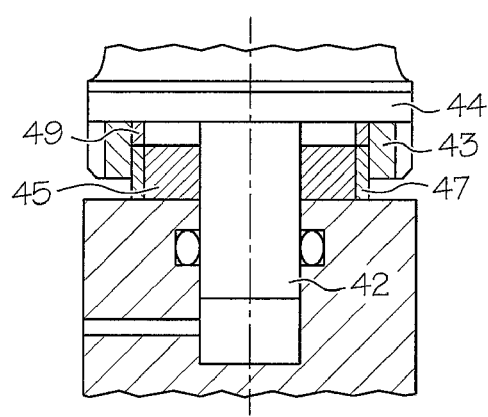
FIG. 4 shows a detail view of a locking device formed in two parts.

Alternatively to the locking device with an adjusting nut 52 of FIG. 3, FIG. 4 shows a locking device formed in two pieces. The locking device consists of an inner ring 45, which is guided through the ram 42. The inner ring 45 has an external thread 47, which is screwed into an internal thread 49 of an outer ring 43. By turning the inner ring 45 with respect to the outer ring 43, the locking device can be adapted to the position of the face plate 44.

FIG. 3 shows further an upper yoke 34 and a lower yoke 36, which are supported against each other by a stay 56, wherein the stay 56 and upper/lower yoke are secured by a screw joint 58.

With the hydraulic cylinder shown in FIG. 3, the sumptuous mechanical positioning of the gearbox, by way of wedges for instance, can be omitted. The accuracy of the positioning by wedges is limited, in addition, the uncoupling elements 30 have to be tensioned only after the positioning of the torque supports when doing so. Tolerances of the stiffness of the uncoupling elements, in connection with the rough positioning by wedges, can lead to additional forces (moments) in the bearing of the planet carrier and of the rotor and also in the rotor shaft, the gearbox carrier and in the shaft-hub-connection between rotor shaft and planet carrier. These have to be taken into account in the dimensioning of the drive train. By the use of the hydraulic cylinder, it is possible to position the support bodies and with these the gearbox in a significantly more simple manner. In addition, the positioning can be checked in the servicing processes even without releasing screw connections which are relevant for the safety.

The positioning of the gearbox and the necessary biasing of the uncoupling elements takes place by way of the hydraulic apparatus, which is integrated into the torque support or the support body 32, respectively. When all the four hydraulic cylinders are pressurised with the same pressure, there will be an equal biasing of all the four uncoupling elements. The defined weight forces of the gearbox act on the bearing of the planet carrier and of the rotor, and in this defined form they can also be accurately taken into account in the dimensioning. Through this, the reaction forces from deformations in the operation are defined by the stiffness of the uncoupling elements in connection with the applied bias.

By pressurising the lower hydraulic cylinders higher, the action of the gravitational force of the gearbox on the bearing can be compensated partially or completely. It is also conceivable that a higher force can be applied, which acts against the gravitational force of the gearbox. By a higher pressurising of the upper hydraulic cylinders, the effect of the gravitational force on the bearing can also be increased.

The use of hydraulic cylinders permits also to perform a reproducible positioning of the gearbox. With the hydraulic apparatus, a positioning of the gearbox at simultaneous biasing of the uncoupling elements takes place also. The maybe occurring deviations in the stiffness of the uncoupling elements are compensated amongst each other in doing so. The elements having different stiffness are deformed in different degrees in this.

When uncoupling elements are used whose stiffness can be regulated hydraulically, the positioning with simultaneous biasing of the uncoupling elements takes place before the uncoupling elements are pressurised for the hydraulic regulation. The necessary forces for applying the bias and the positioning are substantially lower through this.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. An apparatus for positioning a gearbox (22) in a wind energy plant, which gearbox is supported on a bearing structure (16) of the wind energy plant by way of a torque support, wherein the torque support (28) is mounted via at least one uncoupling element (30), which is arranged between torque support (28) and bearing structure (16), the torque support comprises at least one support body (32) and an hydraulic apparatus with at least one hydraulic cylinder (38, 40), by way of which the position of the support body (32) is adjustable with respect to the bearing structure (16), wherein the hydraulic cylinder comprises a ram (42) and a face plate (44), the ram (42) being partially guided in the support body (32) and the face plate (44) being provided outside of the support body (32), the entity of ram and face plate protruding from the support body serving as a support for the uncoupling element arranged on the face plate.

2. An apparatus according to claim 1, characterised in that the hydraulic cylinder is integrated into the support body (32).

3. An apparatus according to claim 1, characterised in that the support body (32) has two hydraulic cylinders, oriented in opposite directions.

4. An apparatus according to claim 1, characterised in that a locking device is provided for the face plate (44), which supports and/or locks the face plate (44) in its position relative to the support body (32).

5. An apparatus according to claim 4, characterised in that the locking device features an adjusting nut (52) and the face plate has an external thread matching with the adjusting nut.

6. An apparatus according to claim 4, characterised in that the locking device features an inner ring (45) with external thread (47) and an outer ring (43) with a matching internal thread (49), which are arranged between face plate (44) and support body.

7. An apparatus according to claim 1, characterised in that the support body (32) has one hydraulic connection (50) for each hydraulic cylinder at a time, in order to actuate the hydraulic cylinder.

8. An apparatus according to claim 1, characterised in that the torque support has two support bodies (32) located opposite to each other.

9. An apparatus according to claim 8, characterised in that each support body is mounted by way of two uncoupling elements (30) located opposite to each other.

10. An apparatus for positioning a gearbox (22) in a wind energy plant, which gearbox is supported on a bearing structure (16) of the wind energy plant by way of a torque support, wherein the torque support (28) comprises two support bodies (32) located opposite to each other, each of which being mounted between two uncoupling elements, arranged between torque support (28) and bearing structure (16), and an hydraulic apparatus with at least one hydraulic cylinder (38, 40), by way of which the position of the support bodies (32) is adjustable with respect to the bearing structure (16).

11. An apparatus according to claim 10, characterised in that the hydraulic cylinder is integrated into one of the two support bodies (32).

12. An apparatus according to claim 10, characterised in that one of the two support bodies (32) has two hydraulic cylinders, oriented in opposite directions.

13. An apparatus according to claim 10, characterised in that the hydraulic cylinder features a ram (42) and a face plate (44), wherein the ram (42) is guided in one of the two support bodies (32) and the face plate (44) is arranged outside of said support body (32).

14. An apparatus according to claim 13, characterised in that a locking device is provided for the face plate (44), which supports and/or locks the face plate (44) in its position relative to the support body (32).

15. An apparatus according to claim 14, characterised in that the locking device features an adjusting nut (52) and the face plate has an external thread matching with the adjusting nut.

16. An apparatus according to claim 14, characterised in that the locking device features an inner ring (45) with external thread (47) and an outer ring (43) with a matching internal thread (49), which are arranged between face plate (44) and support body.

17. An apparatus according to claim 10, characterised in that one of the two support bodies (32) has one hydraulic connection (50) for each hydraulic cylinder at a time, in order to actuate the hydraulic cylinder.

18. An apparatus for positioning a gearbox (22) in a wind energy plant, which gearbox is supported on a bearing structure (16) of the wind energy plant by way of a torque support, wherein the torque support (28) is mounted via at least one uncoupling element (30), which is arranged between torque support (28) and bearing structure (16), the torque support comprising at least one support body (32) and an hydraulic apparatus with two hydraulic cylinders (38, 40), oriented in opposite directions and adjusted independently of each other by being pressurized with different pressures such that the position of the support body (32) is adjustable with respect to the bearing structure (16).

19. An apparatus according to claim 18, characterised in that the two hydraulic cylinders are integrated into the support body (32).

20. An apparatus according to claim 18, characterised in that the two hydraulic cylinders feature a ram (42) and a face plate (44), wherein the ram (42) is guided in the support body (32) and the face plate (44) is arranged outside of the support body (32).

21. An apparatus according to claim 20, characterised in that a locking device is provided for the face plate (44), which supports and/or locks the face plate (44) in its position relative to the support body (32).

22. An apparatus according to claim 21, characterised in that the locking device features an adjusting nut (52) and the face plate has an external thread matching with the adjusting nut.

23. An apparatus according to claim 21, characterised in that the locking device features an inner ring (45) with external thread (47) and an outer ring (43) with a matching internal thread (49), which are arranged between face plate (44) and support body.

24. An apparatus according to claim 18, characterised in that the support body (32) has one hydraulic connection (50) for each hydraulic cylinder at a time, in order to actuate the hydraulic cylinder.

25. An apparatus according to claim 20, characterised in that the torque support has two support bodies (32) located opposite to each other in each of the two support bodies (32) two hydraulic cylinders are integrated oriented in opposite directions and adjusted independently of each other by being pressurized with different pressures such that the position of the support body (32) is adjustable with respect to the bearing structure (16).

26. An apparatus according to claim 25, characterised in that each support body is mounted by way of two uncoupling elements (30) located opposite to each other.

* * * * *